United States Patent
Chen et al.

(10) Patent No.: US 11,789,537 B2
(45) Date of Patent: Oct. 17, 2023

(54) HAPTIC FEEDBACK METHOD AND APPARATUS FOR VIRTUAL KEYS, AND ELECTRONIC DEVICE

(71) Applicants: Beijing BOE Technology Development Co., Ltd., Beijing (CN); BOE Technology Group Co., Ltd., Beijing (CN)

(72) Inventors: Yuju Chen, Beijing (CN); Hui Hua, Beijing (CN); Xiaotong Liu, Beijing (CN); Yongchun Tao, Beijing (CN); Jijing Huang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 85 days.

(21) Appl. No.: 17/615,395

(22) PCT Filed: Feb. 22, 2021

(86) PCT No.: PCT/CN2021/077287
§ 371 (c)(1),
(2) Date: Nov. 30, 2021

(87) PCT Pub. No.: WO2022/174453
PCT Pub. Date: Aug. 25, 2022

(65) Prior Publication Data
US 2023/0185378 A1    Jun. 15, 2023

(51) Int. Cl.
*G06F 3/01*    (2006.01)
*G06F 3/04886*    (2022.01)

(52) U.S. Cl.
CPC .......... *G06F 3/016* (2013.01); *G06F 3/04886* (2013.01)

(58) Field of Classification Search
CPC ........ G06F 3/016; G06F 3/04886; G06F 3/02; G06F 3/044
See application file for complete search history.

(56) References Cited

U.S. PATENT DOCUMENTS

| | | | |
|---|---|---|---|
| 10,078,384 B2 * | 9/2018 | Levesque | G06F 3/0416 |
| 11,086,400 B2 * | 8/2021 | Jonasson | G06F 3/04817 |
| 2010/0156818 A1 * | 6/2010 | Burrough | G06F 3/04883 345/173 |

(Continued)

FOREIGN PATENT DOCUMENTS

| | | |
|---|---|---|
| CN | 104965629 A | 10/2015 |
| CN | 105045498 A | 11/2015 |

(Continued)

*Primary Examiner* — Rodney Amadiz
(74) *Attorney, Agent, or Firm* — IPRO, PLLC

(57) ABSTRACT

The application provides a haptic feedback method and apparatus for virtual keys, and an electronic device, and relates to the field of piezoelectric techniques. A touch display panel is controlled to display at least one virtual key, a touch position detected by the touch display panel is acquired, a target waveform parameter is determined according to a positional relationship between the touch position and each region in a target area corresponding to a target virtual key, and a target drive signal is generated according to the target waveform parameter and is sent to a piezoelectric element.

12 Claims, 5 Drawing Sheets

(56) References Cited

U.S. PATENT DOCUMENTS

2017/0168574 A1    6/2017  Zhang
2017/0205882 A1*   7/2017  Tanaka .................... G06F 3/016

FOREIGN PATENT DOCUMENTS

| CN | 105446646 A | 3/2016 |
| CN | 107422900 A | 12/2017 |
| EP | 2375306 A1 | 10/2011 |

* cited by examiner

HAPTIC FEEDBACK METHOD AND APPARATUS FOR VIRTUAL KEYS, AND ELECTRONIC DEVICE

TECHNICAL FIELD

The application relates to the field of piezoelectric techniques, in particular to a haptic feedback method and apparatus for virtual keys, and an electronic device.

BACKGROUND

With the continuous development of electronic technologies, existing electronic devices are typically provided with touch display panels for realizing human-computer interaction with users. Physical keys have been gradually replaced with virtual keys to adapt to the touch display panels.

However, users cannot obtain actual haptic feedback when operating virtual keys, which makes user experience unsatisfying.

SUMMARY

Some embodiments of the disclosure provide the following technical solution:

In a first aspect, a haptic feedback method for virtual keys is applied to an electronic device comprising a touch display panel and at least one piezoelectric element, and comprises:

controlling the touch display panel to display at least one virtual key;

acquiring a touch position detected by the touch display panel;

determining a target waveform parameter according to a positional relationship between the touch position and each region in a target area corresponding to a target virtual key, wherein the target virtual key is any one of the virtual keys; and generating a target drive signal according to the target waveform parameter, and sending the target drive signal to the piezoelectric element to enable the piezoelectric element to drive the touch display panel to vibrate;

wherein, the target area comprises a key interior region, a key boundary region and a key exterior region, and a target drive signal generated under the condition that the touch position is located in the key boundary region is different from a target drive signal generated under the condition that the touch position is located in the key interior region and a target drive signal generated under the condition that the touch position is located in the key exterior region.

Optionally, the step of determining a target waveform parameter according to a positional relationship between the touch position and each region in a target area corresponding to a target virtual key comprises:

searching for a first waveform parameter corresponding to the key interior region according to a mapping relationship between all the regions in the target area and waveform parameters under the condition that the touch position is located in the key interior region;

searching for a second waveform parameter corresponding to the key boundary region according to the mapping relationship between all the regions in the target area and the waveform parameters under the condition that the touch position is located in the key boundary region; and searching for a third waveform parameter corresponding to the key exterior region according to the mapping relationship between all the regions in the target area and the waveform parameters under the condition that the touch position is located in the key exterior region;

wherein, a first drive signal generated according to the first waveform parameter, a second drive signal generated according to the second waveform parameter, and a third drive signal generated according to the third waveform parameter are different from each other.

Optionally, the key boundary region comprises at least two boundary sub-regions; and regarding a first boundary sub-region and a second boundary sub-region adjacent to the first boundary sub-region, a target drive signal generated under the condition that the touch position is located in the first boundary sub-region is different from a target drive signal generated under the condition that the touch position is located in the second boundary sub-region.

Optionally, after the step of generating a target drive signal according to the target waveform parameter, and sending the target drive signal to the piezoelectric element to enable the piezoelectric element to drive the touch display panel to vibrate, the method further comprises:

stopping sending the target drive signal to the piezoelectric element when a time of the touch position being touched exceeds a preset time.

Optionally, the touch display panel comprises a touch region and an edge region surrounding the touch region, the piezoelectric element is located in the edge region, and the piezoelectric element does not contact with a touch line disposed in the edge region.

In a second aspect, a haptic feedback apparatus for virtual keys is provided and applied to an electronic device comprising a touch display panel and at least one piezoelectric element, and the apparatus comprises: a processor and a waveform generator;

the processor is configured to control the touch display panel to display at least one virtual key, acquire a touch position detected by the touch display panel, and determine a target waveform parameter according to a positional relationship between the touch position and each region in a target area corresponding to a target virtual key, wherein the target virtual key is any one of the virtual keys;

the waveform generator is configured to generate a target drive signal according to the target waveform parameter and send the target drive signal to the piezoelectric element to enable the piezoelectric element to drive the touch display panel to vibrate;

wherein, the target area comprises a key interior region, a key boundary region and a key exterior region, and a target drive signal generated under the condition that the touch position is located in the key boundary region is different from a target drive signal generated under the condition that the touch position is located in the key interior region and a target drive signal generated under the condition that the touch position is located in the key exterior region.

Optionally, the processor is further configured to search for a first waveform parameter corresponding to the key interior region according to a mapping relationship between all the regions in the target area and waveform parameters under the condition that the touch position is located in the key interior region, search for a second waveform parameter corresponding to the key boundary region according to the mapping relationship between all the regions in the target area and the waveform parameters under the condition that the touch position is located in the key boundary region, and search for a third waveform parameter corresponding to the key exterior region according to the mapping relationship between all the regions in the target area and the waveform parameters under the condition that the touch position is located in the key exterior region;

wherein, a first drive signal generated according to the first waveform parameter, a second drive signal generated according to the second waveform parameter, and a third drive signal generated according to the third waveform parameter are different from each other.

Optionally, the key boundary region comprises at least two boundary sub-regions; and regarding a first boundary sub-region and a second boundary sub-region adjacent to the first boundary sub-region, a target drive signal generated when the touch position is located in the first boundary sub-region is different from a target drive signal generated when the touch position is located in the second boundary sub-region.

Optionally, the waveform generator is further configured to stop sending the target drive signal to the piezoelectric element when a time of the touch position being touched exceeds a preset time.

Optionally, the touch display panel comprises a touch region and an edge region surrounding the touch region, the piezoelectric element is located in the edge region, and the piezoelectric element does not contact with a touch line disposed in the edge region.

In a third aspect, an electronic device is provided and comprises a touch display panel, at least one piezoelectric element, and the above haptic feedback apparatus for virtual keys;

wherein, the haptic feedback apparatus for virtual keys is electrically connected to the touch display panel and the piezoelectric element, respectively.

In this embodiment of the application, a touch display panel is controlled to display at least one virtual key, a touch position detected by the touch display panel is acquired, a target waveform parameter is determined according to a positional relationship between the touch position and each region in a target area corresponding to a target virtual key, and a target drive signal is generated according to the target waveform parameter and is sent to a piezoelectric element to enable the piezoelectric element to drive the touch display panel to vibrate; wherein, the target area comprises a key interior region, a key boundary region and a key exterior region, and a target drive signal generated under the condition that the touch position is located in the key boundary region is different from a target drive signal generated under the condition that the touch position is located in the key interior region and a target drive signal generated under the condition that the touch position is located in the key exterior region. The target area corresponding to the target virtual key is divided, different drive signals are used to drive the piezoelectric element to vibrate when the fingers of users touch different regions of the target virtual key, and then the piezoelectric element drives the touch display panel to vibrate; in addition, when different drive signals are provided for the piezoelectric element, different frictions will be generated between the fingers of the users and the surface of the touch display panel, such that the fingers of the users may clearly feel the change of the friction in different regions, the users may feel the boundary of the virtual key when moving their fingers on the surface of the touch display panel, and in this way, the virtual key has more realistic haptic feedback, and the touch experience of the users is improved.

The aforesaid description is merely a brief summary of the technical solution of the disclosure. To allow those skilled in the art to gain a better understanding of the technical means of the disclosure to implement the disclosure according to the contents in the specification and to make the above and other purposes, features and advantages of the disclosure clearer, specific implementations of the disclosure are given below.

BRIEF DESCRIPTION OF THE DRAWINGS

To more clearly explain the technical solutions of the embodiments of the application or the prior art, drawings used for describing the embodiments of the application or the prior arts will be briefly introduced below. Obviously, the drawings in the following description only illustrate some embodiments of the application, and those ordinarily skilled in the art can obtain other drawings according to the following ones without creative labor.

DETAILED DESCRIPTION

To clarify the purposes, technical solutions and advantages of the embodiments of the application, the technical solutions of the embodiments of the application will be clearly and completely described below in conjunction with the drawings of the embodiments of the application. Obviously, the embodiments in the following description are merely illustrative ones, and are not all possible ones of the application. All other embodiments obtained by those ordinarily skilled in the art based on the following ones without creative labor should also fall within the protection scope of the application.

Figure 1:
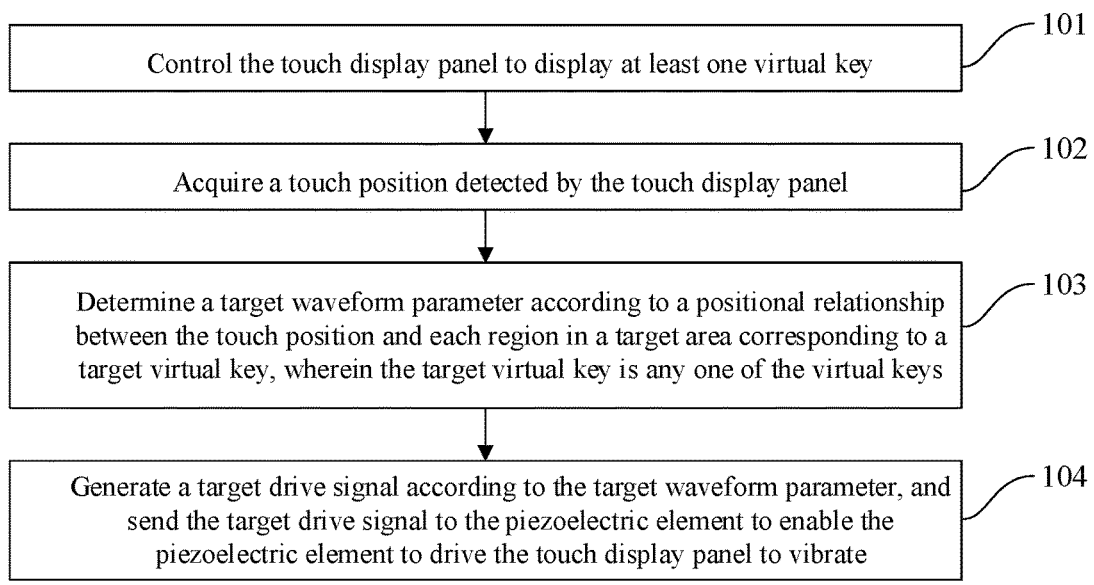
FIG. 1 illustrates a flow diagram of a haptic feedback method for virtual keys according to one embodiment of the application.

Referring to FIG. 1 which illustrates a flow diagram of a haptic feedback method for virtual keys according to one embodiment of the application, the haptic feedback method is applied to an electronic device comprising a touch display panel and at least one piezoelectric element, and may specifically comprise the following steps:

101: the touch display panel is controlled to display at least one virtual key.

In this embodiment of the application, the electronic device comprises a touch display panel which is an on-cell touch display panel or an in-cell touch display panel; when the touch display panel is the on-cell touch display panel, the touch display panel comprises a display panel and a touch panel disposed on a light emitting side of the display panel; and when the touch display panel is the in-cell touch display panel, a touch electrode may be embedded in a display panel. Wherein, the display panel may be a liquid crystal display (LCD) display panel or an organic light-emitting diode (OLED) display panel.

In actual application, the touch display panel is connected to a drive chip. The drive chip comprises a gate drive chip and a source drive chip, wherein the gate drive chip sends a corresponding gate signal to the touch display panel, the source drive chip sends a corresponding data signal to the touch display panel to control the touch display panel to display a target image, and the target image is an image comprising at least one virtual key.

Figure 2:
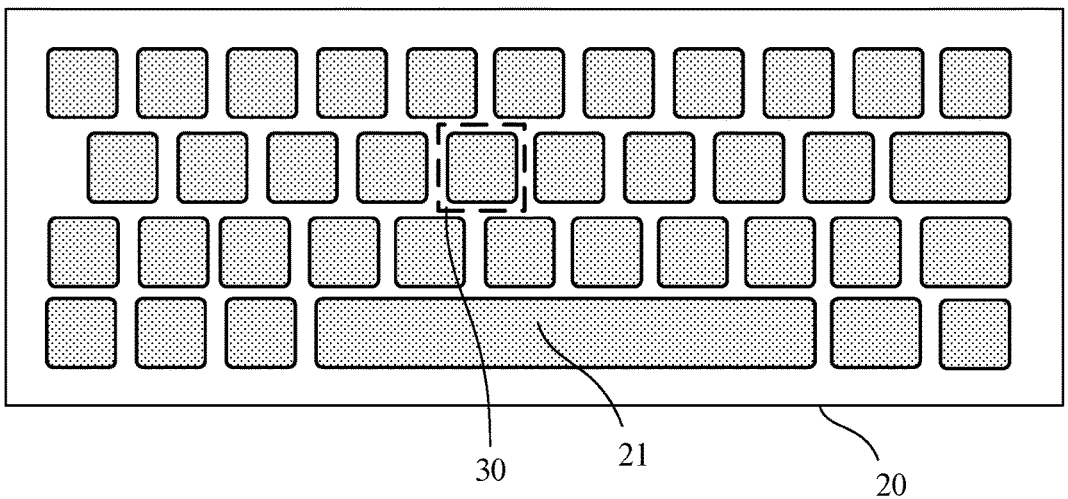
FIG. 2 illustrates a schematic diagram of a virtual keyboard displayed by a touch display panel according to one embodiment of the application.

As shown in FIG. 2, the target image displayed by the touch display panel comprises a virtual keyboard 20 including multiple virtual keys 21.

It should be noted that the drive chip may be integrated in a processor, that is, the processor comprises the drive chip, and in this case, the touch display panel is connected to the processor. Or, the drive chip and the processor may be arranged separately, and in this case, the touch display panel is connected to the drive chip.

102: a touch position detected by the touch display panel is acquired.

In this embodiment of the application, the touch display panel comprises a touch region and an edge region surrounding the touch region, wherein multiple touch electrodes are disposed in the touch region, and a touch line connected to the touch electrodes is disposed in the edge region and is connected to the processor.

When the fingers of users touch the surface of the touch display panel, the voltage of a touch capacitor corresponding to the touch electrode at the touch position will change, the voltages corresponding to the touch electrodes at all positions are sent to the processor by the touch line, and the processor determines the touch position of the users according to the voltages sent by the touch line.

During actual use, when users touch the surface of the touch display panel with their fingers, the touch position between the fingers of the users and the touch display panel has a certain area, so the touch area of the finger of the user is actually determined by the processor according to the voltages sent by the touch line; and then, the center of the touch area is determined as the touch position, and the center of the touch area may be the centroid of the touch area.

In an actual product, the processor may be an upper computer, a field programmable gate array (FPGA), or a drive integrated circuit (IC); and the touch display panel may be connected to the processor directly by means of a line or by a universal serial bus (USB) interface.

It should be noted that the fingers of the users may touch the touch display panel by mistake in actual use, and in this case, the processor may acquire at least two initial touch positions. To accurately determine the virtual key to be touched by the users, the processor may acquire the touch pressure corresponding to each initial touch position, then determine the initial touch position with the maximum touch pressure as a final touch position, and compare the final touch position with coordinates of each region in a target area corresponding to a target virtual key, and initial touch positions with the touch pressures being less than the maximum touch pressure may be ignored.

103: a target waveform parameter is determined according to a positional relationship between the touch position and all regions of a target area corresponding to a target virtual key, wherein the target virtual key is any one virtual key.

In this embodiment of the application, any one virtual key may be used as the target virtual key, and the target area corresponding to the target virtual key is divided into a key interior region, a key boundary region and a key exterior region, that is, the target area comprises the key interior region, the key boundary region and the key exterior region.

As shown in FIG. 2, the target area corresponding to the target virtual key is an area 30 defined by the dashed box, and the target area 30 corresponding to the target virtual key is divided into multiple regions to obtain the divisional diagrams illustrated by FIG. 3 to FIG. 6. As shown in FIG. 3 to FIG. 6, the target area 30 corresponding to the target virtual key comprises a key interior region 31, a key boundary region 32 and a key exterior region 33, the key boundary region 32 surrounds the key interior region 31, the key exterior region 33 is located on a side, away from the key interior region 31, of the key boundary region 32, and the key interior region 31 is in a closed shape such as circular, rectangular, triangular or hexagonal.

When acquiring the touch position of users, the processor compares the touch position with coordinate positions of the key interior region, the key boundary region and the key exterior region in the target area corresponding to the target virtual key to determine whether the touch position is located in the key interior region, the key boundary region or the key exterior position.

When the processor determines the region where the touch position is located, the corresponding target waveform parameter is determined according to the region where the touch position is located; and a target waveform parameter corresponding to the key boundary region is different from a target waveform parameter corresponding to the key interior region and a target waveform parameter corresponding to the key exterior region.

Wherein, the target waveform parameter comprises waveform type, frequency and amplitude; and the waveform type may be sine waveform, square waveform, sawtooth waveform, pulse waveform, or the like.

104: a target drive signal is generated according to the target waveform parameter and is sent to the piezoelectric element to enable the piezoelectric element to drive the touch display panel to vibrate.

In this embodiment of the application, the electronic device is further provided with a waveform generator and the piezoelectric element, and the waveform generator is connected to the processor and the piezoelectric element. Wherein, the piezoelectric element may be a piezoelectric ceramic plate attached to the touch display panel or a piezoelectric ceramic film formed on the touch display panel, and comprises a first electrode, a second electrode, and a piezoelectric layer disposed between the first electrode and the second electrode. The piezoelectric layer may be made of piezoelectric ceramic (PZT).

Optionally, the touch display panel comprises a touch region and an edge region surrounding the touch edge, and the piezoelectric element is located in the edge region of the touch display panel and does not contact with a touch line disposed in the edge region.

The piezoelectric element is disposed in the edge region of the touch display panel to be prevented against contact with the touch line disposed in the edge region, such that interference between the touch line and the piezoelectric element is avoided, thus improving the detection accuracy of the touch position and the accuracy of haptic feedback.

After being determined by the processor, the target waveform parameter is sent to the waveform generator; the waveform generator generates the target drive signal according to the target waveform parameter; then, the waveform generator sends the target drive signal to the piezoelectric element; and when receiving the target drive signal, the piezoelectric element vibrates to drive the touch display panel to vibrate, and at this moment, a surface friction will be generated between the fingers of the users and the surface of the touch display panel at the touch position.

In addition, because the target waveform parameter corresponding to the key boundary region is different from the target waveform parameters corresponding to the key interior region and the key exterior region, a target drive signal generated when the touch position is located in the key boundary region is different from a target drive signal generated when the touch position is located in the key interior region and a target drive signal generated when the touch position is located in the key exterior region. The target drive signal generated when the touch position is located in the key interior region and the target drive signal generated when the touch position is located in the key exterior region may be the same or different.

When the fingers of the users touch different regions of the target virtual key, different target drive signals will be provided for the piezoelectric element, and different frictions will be generated between the fingers and the surface of the touch display panel, so the users may feel the boundary of the virtual key when moving their fingers on the surface of the touch display panel, and a sense of solidity is realized when the users touch the virtual key.

For example, when the touch position is located in the key interior region, the corresponding target waveform parameter is a waveform parameter 1, and the generated target drive signal is a drive signal 1; when the touch position is located in the key boundary region, the corresponding target waveform parameter is a waveform parameter 2, and the generated target drive signal is a drive signal 2; and when the touch position is located in the key exterior region, the corresponding target waveform parameter is a waveform parameter 3, and the generated target drive signal is a drive signal 3. In addition, the waveform parameter 2 is different from the waveform parameter 1 and the waveform parameter 3, and the drive signal 2 is different from the drive signal 1 and the drive signal 3, so when the initial touch position of the fingers of the users is located in the key interior region, the piezoelectric element is controlled to vibrate by the drive signal 1, and at this moment, the users may perceive a frictional touch sense created by the drive signal 1; when the fingers of the users further move into the key boundary region, the piezoelectric element is controlled to vibrate by the drive signal 2, and at this moment, the users may perceive a frictional touch sense created by the drive signal 2; and when the fingers of the users further move into the key exterior region, the piezoelectric element is controlled to vibrate by the drive signal 3, and at this moment, the users may perceive a frictional touch sense created by the drive signal 3. Because different frictional touch senses may be created by different drive signals, the users may perceive the change of the friction in different regions when moving their fingers on the surface of the touch display panel, so as to feel the boundary of the virtual key. In addition, the drive signal 2 is different from the drive signal 1 and the drive signal 3, but the drive signal 1 and the drive signal 3 may be the same or different.

It should be noted that all the areas of the touch display panel vibrate in a vibration mode created by the same target drive signal at each moment, that is, only one target drive signal is provided for the piezoelectric element at each moment, and the piezoelectric element vibrates to drive all the areas of the touch display panel to vibrate at the same amplitude, frequency and waveform; in addition, when the touch display panel is the on-cell touch display panel, the display panel is spaced from the touch panel by a certain distance, such that the piezoelectric element only drives the touch panel to vibrate, and the display panel does not vibrate.

Figure 3:
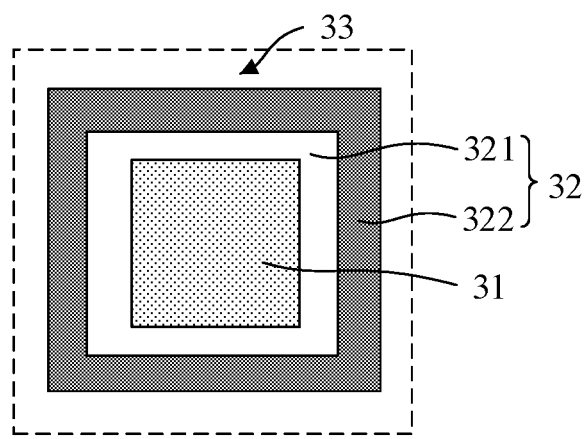
FIG. 3 illustrates a first divisional diagram of a target area corresponding to a target virtual key according to one embodiment of application.
Figure 4:
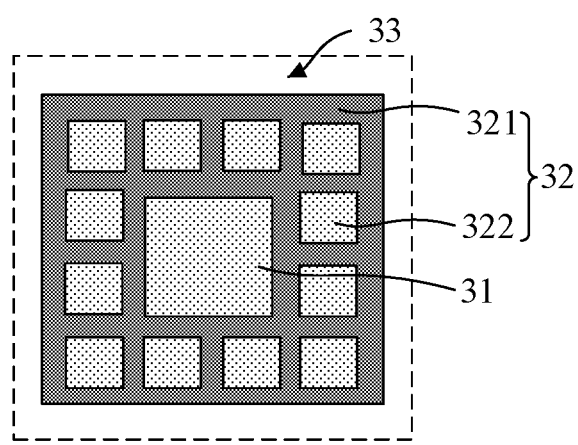
FIG. 4 illustrates a second divisional diagram of the target area corresponding to the target virtual key according to one embodiment of the application.
Figure 5:
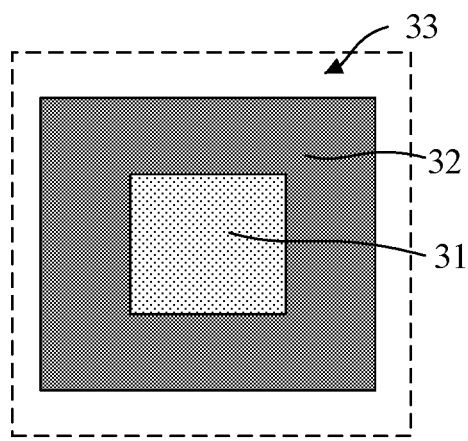
FIG. 5 illustrates a third divisional diagram of the target area corresponding to the target virtual key according to one embodiment of the application.
Figure 6:
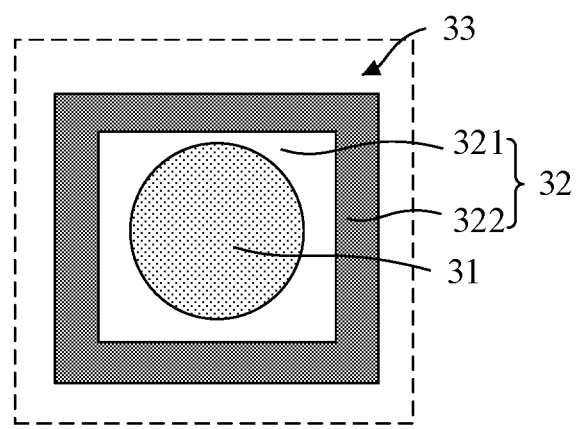
FIG. 6 illustrates a fourth divisional diagram of the target area corresponding to the target virtual key according to one embodiment of the application.

In actual application, when the target area corresponding to the target virtual key is divided, the key boundary region may be only one region, that is to say, the target area comprises only one key boundary region 32, a shown in FIG. 5. Or, the key boundary region may be divided into multiple boundary sub-regions. For example, as shown in FIG. 3 and FIG. 6, the key boundary region comprises two boundary sub-regions which are a first boundary sub-region 321 and a second boundary sub-region 322 respectively. As shown in FIG. 4, the key boundary region comprises thirteen boundary sub-regions which are a first boundary sub-region 321 and twelve second boundary sub-regions 322 respectively, and the twelve second boundary sub-regions 322 are of the same shape and size.

Specifically, the key boundary region comprises at least two boundary sub-regions. Regarding a first boundary sub-region and a second boundary sub-region adjacent to the first boundary sub-region, a target drive signal generated when the touch position is located in the first boundary sub-region is different from a target drive signal generated when the touch position is located in the second boundary sub-region.

The key boundary region is further divided into multiple boundary sub-regions, a corresponding target waveform parameter acquired when the touch position of the users is located in the first boundary sub-region is different from a corresponding target waveform parameter acquired when the touch position is located in the second boundary sub-region, and correspondingly, a target drive signal generated when the touch position is located in the first boundary sub-region is different from a target drive signal generated when the touch position is located in the second boundary sub-region, such that the users may more clearly feel the boundary of the virtual key when moving their fingers on the touch display panel.

For example, as shown in FIG. 3, FIG. 4 and FIG. 6, when the touch position is located in the key interior region 31, the corresponding target waveform parameter is the waveform parameter 1, and the generated target drive signal is the drive signal 1; when the touch position is located in the first boundary sub-region 321 of the key boundary region 32, the corresponding target waveform parameter is a waveform parameter 4, and the generated target drive signal is a drive signal 4; when the touch position is located in the secondary boundary sub-region 322 of the key boundary region 32, the corresponding waveform parameter is a waveform parameter 5, and the generated target drive signal is a drive signal 5; and when the touch position is located in the key exterior region 33, the corresponding target waveform parameter is the waveform parameter 3, and the generated target drive signal is the drive signal 3. Wherein, the waveform parameter 4 is different from the waveform parameter 5 and the waveform parameter 1, and the waveform parameter 5 is different from the waveform parameter 3; and correspondingly, the drive signal 4 is different from the drive signal 5 and the drive signal 1, and the drive signal 5 is different from the drive signal 3.

In this embodiment of the application, the target area corresponding to the target virtual key is divided, different drive signals are used to drive the piezoelectric element to vibrate when the fingers of users touch different regions of the target virtual key, and then the piezoelectric element drives the touch display panel to vibrate; in addition, when different drive signals are provided for the piezoelectric element, different frictions will be generated between the fingers of the users and the surface of the touch display panel, such that the fingers of the users may clearly feel the change of the friction in different regions, the users may feel the boundary of the virtual key when moving their fingers on the surface of the touch display panel, and in this way, the virtual key has more realistic haptic feedback, and the touch experience of the users is improved.

Figure 7:
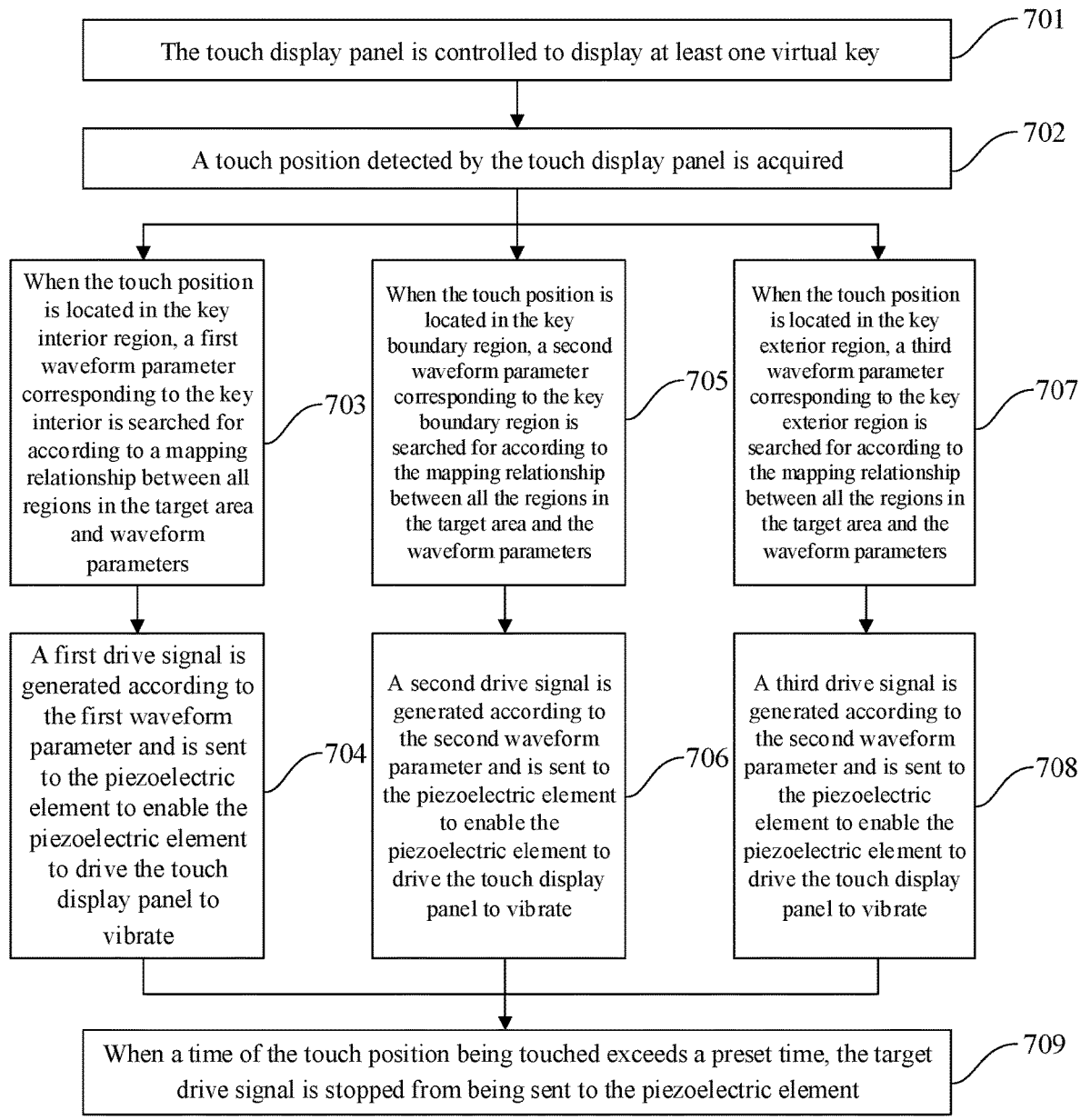
FIG. 7 illustrates a flow diagram of another haptic feedback method for virtual keys according to one embodiment of the application.

Referring to FIG. 7 which illustrates a flow diagram of another haptic feedback method for virtual keys according to one embodiment of the application, the method may specifically comprise the following steps:

701: the touch display panel is controlled to display at least one virtual key.

This step is similar to step 101 in principle, and will no longer be detailed here.

702: a touch position detected by the touch display panel is acquired.

This step is similar to step 102 in principle, and will no longer be detailed here.

703: when the touch position is located in the key interior region, a first waveform parameter corresponding to the key interior is searched for according to a mapping relationship between all regions in the target area and waveform parameters.

In this embodiment of the application, the electronic device is further provided with a memory connected to the processor, and the memory stores the mapping relationship between all the regions in the target area and the waveform parameters, that is, the memory stores a mapping relationship between the key interior region and the corresponding waveform parameter, between the key boundary region and the corresponding waveform parameter, as well as between the key exterior region and the corresponding waveform parameter.

When determining that the touch position is located in the key interior region, the processor searches for a first waveform parameter corresponding to the key interior region according to the mapping relationship between all the regions in the target area and the waveform parameters stored the memory, and in this case, the target waveform parameter is the first waveform parameter.

704: a first drive signal is generated according to the first waveform parameter and is sent to the piezoelectric element to enable the piezoelectric element to drive the touch display panel to vibrate.

In this embodiment of the application, when searching out the first waveform parameter, the processor sends the first waveform parameter to the waveform generator, the waveform generator generates a first drive signal according to the first waveform parameter and then sends the first drive signal to the piezoelectric element, and when receiving the first drive signal, the piezoelectric element vibrates to drive the touch display panel to vibrate. In this case, the target drive signal is the first drive signal.

705: when the touch position is located in the key boundary region, a second waveform parameter corresponding to the key boundary region is searched for according to the mapping relationship between all the regions in the target area and the waveform parameters.

In this embodiment of the application, when determining that the touch position is located in the key boundary region, the processor searches for a second waveform parameter corresponding to the key boundary region according to the mapping relationships between all the regions in the target area and the waveform parameters stored in the memory, and in this case, the target waveform parameter is the second waveform parameter.

706: a second drive signal is generated according to the second waveform parameter and is sent to the piezoelectric element to enable the piezoelectric element to drive the touch display panel to vibrate.

In this embodiment of the application, when searching out the second waveform parameter, the processor sends the second waveform parameter to the waveform generator, the waveform generator generates a second drive signal according to the second waveform parameter and then sends the second drive signal to the piezoelectric element, and when receiving the second drive signal, the piezoelectric element vibrates to drive the touch display panel to vibrate. In this case, the target drive signal is the second drive signal.

707: when the touch position is located in the key exterior region, a third waveform parameter corresponding to the key exterior region is searched for according to the mapping relationship between all the regions in the target area and the waveform parameters.

In this embodiment of the application, when determining that the touch position is located in the key exterior region, the processor searches for a third waveform parameter corresponding to the key exterior region according to the mapping relationship between all the regions in the target area and the waveform parameters stored in the memory, and in this case, the target waveform parameter is the third waveform parameter.

708: a third drive signal is generated according to the second waveform parameter and is sent to the piezoelectric element to enable the piezoelectric element to drive the touch display panel to vibrate.

In this embodiment of the application, when searching out the third waveform parameter, the processor sends the third waveform parameter to the waveform generator, the waveform generator generates a third drive signal according to the third waveform parameter and then sends the third drive signal to the piezoelectric element, and when receiving the third drive signal, the piezoelectric element vibrates to drive the touch display panel to vibrate. In this case, the target drive signal is the third drive signal.

Wherein, the first waveform parameter, the second waveform parameter and the third waveform parameter are different from each other, and correspondingly, the first drive signal generated according to the first waveform parameter, the second drive signal generated according to the second waveform parameter, and the third drive signal generated according to the third waveform parameter are different from each other, that is, the first drive signal is different from the second drive signal, the second drive signal is different from the third drive signal, and the first drive signal is different from the third drive signal.

709: when a time of the touch position being touched exceeds a preset time, the target drive signal is stopped from being sent to the piezoelectric element.

In this embodiment of the application, the target drive signal is generated according to the touch position of users and controls the piezoelectric element to vibrate to drive the touch display panel to vibrate, and the users may feel the boundary of the virtual key according to the friction between the fingers and the surface of the touch display panel.

However, when the users keep touching one touch position over a preset time, the processor will send an output stop signal to the waveform generator to enable the waveform generator to stop sending the target drive signal to the piezoelectric element, and then the piezoelectric element will stop vibrating and stop driving the touch display panel to vibrate.

When users keep touching one touch position for a long time, the piezoelectric element will drive the touch display panel to vibrate ceaselessly, and when the time of the touch position being touched exceeds a preset time, the fingers of the users will become numb due to long-term contact with the vibrating touch display panel, and will be unable to feel the boundary of the virtual key. In view of this, the target drive signal will be stopped from being sent to the piezoelectric element when users keep touching one touch position over a preset time, such that the power consumption of the electronic device is reduced. The preset time may be set as an empirical value such as 10 s or 20 s.

In this embodiment of the application, the target area corresponding to the target virtual key is divided into multiple regions, different drive signals are used to drive the piezoelectric element to vibrate when the fingers of users touch different regions of the target virtual key, and then the piezoelectric element drives the touch display panel to vibrate; in addition, when different drive signals are provided for the piezoelectric element, different frictions will be generated between the fingers of the users and the surface of the touch display panel, such that the fingers of the users may clearly perceive the change of the friction in different regions, the users may feel the boundary of the virtual key when moving their fingers on the surface of the touch display panel, and thus, the virtual key has more realistic haptic feedback, and the touch experience of the users is improved; moreover, when the users keep touching one touch position over a preset time, the target drive signal will be stopped from being sent to the piezoelectric element, such that the power consumption of the electronic device is reduced.

Figure 8:
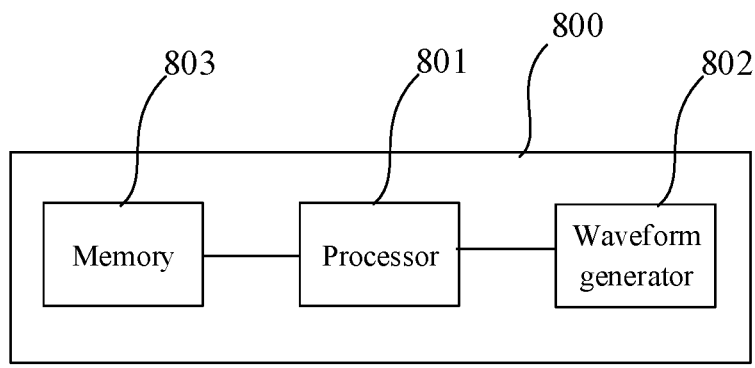
FIG. 8 illustrates a structural diagram of a haptic feedback apparatus for virtual keys according to one embodiments of the application.

Refer to FIG. 8 which illustrates a structural diagram of a haptic feedback apparatus for virtual keys according to one embodiment of the application.

A haptic feedback apparatus 800 for virtual keys in this embodiment of the application is applied to an electronic device comprising a touch display panel and at least one piezoelectric element. The haptic feedback apparatus 800 for virtual keys comprises a processor 801 and a waveform generator 802, wherein the processor 801 is connected to the waveform generator 802.

The processor 801 is configured to control the touch display panel to display at least one virtual key, acquire a touch position detected by the touch display panel, and determine a target waveform parameter according to a positional relationship between the touch position and each region in a target area corresponding to a target virtual key, wherein the target virtual key is any one said virtual key;

The waveform generator 802 is configured to generate a target drive signal according to the target waveform parameter and send the target drive signal to the piezoelectric element to enable the piezoelectric element to drive the touch display panel to vibrate;

Wherein, the target area comprises a key interior region, a key boundary region and a key exterior region, and a target drive signal generated when the touch position is located in the key boundary region is different from a target drive signal generated when the touch position is located in the key interior region and a target drive signal generated when the touch position is located in the key exterior region.

Optionally, the processor 801 is specifically configured to search for a first waveform parameter corresponding to the key interior region according to a mapping relationship between all the regions in the target area and waveform parameters when the touch position is located in the key interior region, search for a second waveform parameter corresponding to the key boundary region according to the mapping relationship between all the regions in the target area and the waveform parameters when the touch position is located in the key boundary region, and search for a third waveform parameter corresponding to the key exterior region according to the mapping relationship between all the regions in the target area and the waveform parameters when the touch position is located in the key exterior region;

Wherein, a first drive signal generated according to the first waveform parameter, a second drive signal generated according to the second waveform parameter, and a third drive signal generated according to the third waveform parameter are different from each other.

In this case, the electronic device is further provided with a memory 803, wherein the memory 803 is connected to the processor 801 and stores the mapping relationship between all the regions in the target area and the waveform parameters.

Optionally, the key boundary region comprises at least two boundary sub-regions;

Regarding a first boundary sub-region and a second boundary sub-region adjacent to the first boundary sub-region, a target drive signal generated when the touch position is located in the first boundary sub-region is different from a target drive signal generated when the touch position is located in the second boundary sub-region.

Optionally, the waveform generator 802 is further configured to stop sending the target drive signal to the piezoelectric element when a time of the touch position being touched exceeds a preset time.

Optionally, the touch display panel comprises a touch region and an edge region surrounding the touch region, and the piezoelectric element is located in the edge region and does not contact with a touch line disposed in the edge region.

In this embodiment of the application, the target area corresponding to the target virtual key is divided into multiple regions, different drive signals are used to drive the piezoelectric element to vibrate when the fingers of users touch different regions of the target virtual key, and then the piezoelectric element drives the touch display panel to vibrate; in addition, when different drive signals are provided for the piezoelectric element, different frictions will be generated between the fingers of the users and the surface of the touch display panel, such that the fingers of the users may clearly perceive the change of the friction in different regions, the users may feel the boundary of the virtual key when moving their fingers on the surface of the touch display panel, and thus, the virtual key has more realistic haptic feedback, and the touch experience of the users is improved.

Figure 9:
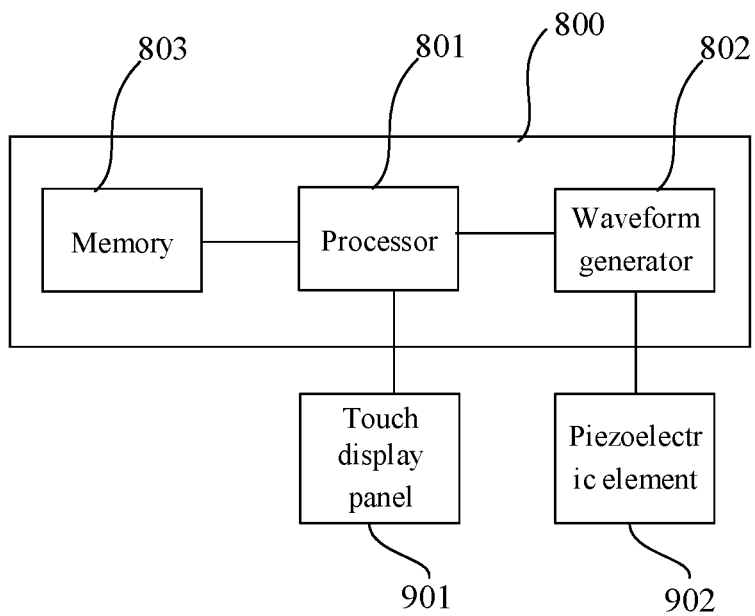
FIG. 9 illustrates a structural diagram of an electronic device according to one embodiment of the application.

Refer to FIG. 9 which illustrates a structural diagram of an electronic device according to one embodiment of the application.

An electronic device in this embodiment of the application comprises a touch display panel 901, at least one piezoelectric element 901, and the haptic feedback apparatus 800 for virtual keys, wherein the haptic feedback apparatus 800 for virtual keys is connected to the touch display panel 901 and the piezoelectric element 901.

When the touch display panel 901 is an on-cell touch display panel, the touch display panel 901 comprises a display panel and a touch panel disposed on a light emitting side of the display panel, and the piezoelectric element 902 is located on a side, close to the display panel, of the touch panel, or is located on a side, away from the display panel, of the touch panel. When the touch display panel 901 is an in-cell touch display panel, the piezoelectric element 902 is located on a light emitting side of the touch display panel 901.

Specifically, the haptic feedback apparatus 800 for virtual keys comprises a processor 801 and a waveform generator 802, wherein a drive chip may be integrated in the processor 801, the processor 801 is connected to the touch display panel 901 and the waveform generator 802, and the waveform generator 802 is connected to the piezoelectric element 902.

In this embodiment of the application, the target area corresponding to the target virtual key is divided into multiple regions, different drive signals are used to drive the piezoelectric element to vibrate when the fingers of users touch different regions of the target virtual key, and then the piezoelectric element drives the touch display panel to vibrate; in addition, when different drive signals are provided for the piezoelectric element, different frictions will be generated between the fingers of the users and the surface of the touch display panel, such that the fingers of the users may clearly perceive the change of the friction in different regions, the users may feel the boundary of the virtual key when moving their fingers on the surface of the touch display panel, and thus, the virtual key has more realistic haptic feedback, and the touch experience of the users is improved.

"One embodiment", "an embodiment" or "one or more embodiments" in this specification means that specific features, structures, or characteristics described in conjunction with said embodiment are included in at least one embodiment of the disclosure. In addition, it should be noted that the expression "in one embodiment" does not definitely refer to the same embodiment.

A great number of specific details are provided in this specification. However, it can be understood that the embodiments of the application can be implemented even without these specific details. In some embodiments, known methods, structures and techniques are not stated in detail to ensure that the understanding of this specification will not be obscured.

In the Claims, any reference marks should not be construed as limitations of the Claims. The term "comprise" shall not exclude the existence of elements or steps not listed in the Claims. "A/an" or "one" before an element shall not exclude the possibility of multiple said elements. The application may be implemented by means of hardware comprising a plurality of different elements and a properly programmed computer. In a Claim in which a plurality of devices are listed, several of these devices may be specifically implemented by means of the same hardware. Terms such as "first", "second" and "third" do not indicate any order, and may be interpreted as names.

Finally, it should be noted that the above embodiments are merely used to explain the technical solutions of the application, and are not intended to limit the application. Although the application has been explained in detail with reference to the above embodiments, those ordinarily skilled in the art would appreciate that the technical solutions recorded in these embodiments can still be amended or part of the technical features in these embodiments can be equivalently substituted without causing the essence of corresponding technical solutions to deviate from the spirit and scope of the technical solutions of these embodiments.

The invention claimed is:

1. A haptic feedback method for virtual keys, wherein the method is applied to an electronic device comprising a touch display panel and at least one piezoelectric element, and the method comprises:
    controlling the touch display panel to display at least one virtual key;
    acquiring a touch position detected by the touch display panel;
    determining a target waveform parameter according to a positional relationship between the touch position and each region in a target area corresponding to a target virtual key, wherein the target virtual key is any one of the virtual keys; and
    generating a target drive signal according to the target waveform parameter, and sending the target drive signal to the piezoelectric element to enable the piezoelectric element to drive the touch display panel to vibrate;
    wherein, the target area comprises a key interior region, a key boundary region and a key exterior region, and a target drive signal generated under the condition that the touch position is located in the key boundary region is different from a target drive signal generated under the condition that the touch position is located in the key interior region and a target drive signal generated under the condition that the touch position is located in the key exterior region;
    the key boundary region comprises at least two boundary sub-regions; and
    regarding a first boundary sub-region and a second boundary sub-region adjacent to the first boundary sub-region, a target drive signal generated under the condition that the touch position is located in the first boundary sub-region is different from a target drive signal generated under the condition that the touch position is located in the second boundary sub-region.

2. The method according to claim 1, wherein the step of determining a target waveform parameter according to a positional relationship between the touch position and each region in a target area corresponding to a target virtual key comprises:
    searching for a first waveform parameter corresponding to the key interior region according to a mapping relationship between all the regions in the target area and waveform parameters under the condition that the touch position is located in the key interior region;
    searching for a second waveform parameter corresponding to the key boundary region according to the mapping relationship between all the regions in the target area and the waveform parameters under the condition that the touch position is located in the key boundary region; and
    searching for a third waveform parameter corresponding to the key exterior region according to the mapping relationship between all the regions in the target area and the waveform parameters under the condition that the touch position is located in the key exterior region;
    wherein, a first drive signal generated according to the first waveform parameter, a second drive signal generated according to the second waveform parameter, and a third drive signal generated according to the third waveform parameter are different from each other.

3. The method according to claim 1, wherein after the step of generating a target drive signal according to the target waveform parameter, and sending the target drive signal to the piezoelectric element to enable the piezoelectric element to drive the touch display panel to vibrate, the method further comprises:
stopping sending the target drive signal to the piezoelectric element when a time of the touch position being touched exceeds a preset time.

4. The method according to claim 1, wherein the touch display panel comprises a touch region and an edge region surrounding the touch region, the piezoelectric element is located in the edge region, and the piezoelectric element does not contact with a touch line disposed in the edge region.

5. A haptic feedback apparatus for virtual keys, wherein the apparatus is applied to an electronic device comprising a touch display panel and at least one piezoelectric element, and the apparatus comprises: a processor and a waveform generator;
the processor is configured to control the touch display panel to display at least one virtual key, acquire a touch position detected by the touch display panel, and determine a target waveform parameter according to a positional relationship between the touch position and each region in a target area corresponding to a target virtual key, wherein the target virtual key is any one of the virtual keys;
the waveform generator is configured to generate a target drive signal according to the target waveform parameter and send the target drive signal to the piezoelectric element to enable the piezoelectric element to drive the touch display panel to vibrate;
wherein, the target area comprises a key interior region, a key boundary region and a key exterior region, and a target drive signal generated under the condition that the touch position is located in the key boundary region is different from a target drive signal generated under the condition that the touch position is located in the key interior region and a target drive signal generated under the condition that the touch position is located in the key exterior region;
the key boundary region comprises at least two boundary sub-regions; and
regarding a first boundary sub-region and a second boundary sub-region adjacent to the first boundary sub-region, a target drive signal generated when the touch position is located in the first boundary sub-region is different from a target drive signal generated when the touch position is located in the second boundary sub-region.

6. The apparatus according to claim 5, wherein the processor is further configured to search for a first waveform parameter corresponding to the key interior region according to a mapping relationship between all the regions in the target area and waveform parameters under the condition that the touch position is located in the key interior region, search for a second waveform parameter corresponding to the key boundary region according to the mapping relationship between all the regions in the target area and the waveform parameters under the condition that the touch position is located in the key boundary region, and search for a third waveform parameter corresponding to the key exterior region according to the mapping relationship between all the regions in the target area and the waveform parameters under the condition that the touch position is located in the key exterior region;
wherein, a first drive signal generated according to the first waveform parameter, a second drive signal generated according to the second waveform parameter, and a third drive signal generated according to the third waveform parameter are different from each other.

7. The apparatus according to claim 5, wherein the waveform generator is further configured to stop sending the target drive signal to the piezoelectric element when a time of the touch position being touched exceeds a preset time.

8. The apparatus according to claim 5, wherein the touch display panel comprises a touch region and an edge region surrounding the touch region, the piezoelectric element is located in the edge region, and the piezoelectric element does not contact with a touch line disposed in the edge region.

9. An electronic device, comprising a touch display panel, at least one piezoelectric element, and the haptic feedback apparatus for virtual keys according to claim 5;
wherein, the haptic feedback apparatus for virtual keys is electrically connected to the touch display panel and the piezoelectric element, respectively;
the key boundary region comprises at least two boundary sub-regions; and
regarding a first boundary sub-region and a second boundary sub-region adjacent to the first boundary sub-region, a target drive signal generated when the touch position is located in the first boundary sub-region is different from a target drive signal generated when the touch position is located in the second boundary sub-region.

10. The electronic device according to claim 9, wherein the processor is further configured to search for a first waveform parameter corresponding to the key interior region according to a mapping relationship between all the regions in the target area and waveform parameters under the condition that the touch position is located in the key interior region, search for a second waveform parameter corresponding to the key boundary region according to the mapping relationship between all the regions in the target area and the waveform parameters under the condition that the touch position is located in the key boundary region, and search for a third waveform parameter corresponding to the key exterior region according to the mapping relationship between all the regions in the target area and the waveform parameters under the condition that the touch position is located in the key exterior region;
wherein, a first drive signal generated according to the first waveform parameter, a second drive signal generated according to the second waveform parameter, and a third drive signal generated according to the third waveform parameter are different from each other.

11. The electronic device according to claim 9, wherein the waveform generator is further configured to stop sending the target drive signal to the piezoelectric element when a time of the touch position being touched exceeds a preset time.

12. The electronic device according to claim 9, wherein the touch display panel comprises a touch region and an edge region surrounding the touch region, the piezoelectric element is located in the edge region, and the piezoelectric element does not contact with a touch line disposed in the edge region.

* * * * *